United States Patent
Konishi

(10) Patent No.: US 10,099,509 B2
(45) Date of Patent: Oct. 16, 2018

(54) WHEEL BEARING APPARATUS INCORPORATED WITH A WHEEL SPEED DETECTING APPARATUS

(71) Applicant: NTN Corporation, Osaka-shi (JP)

(72) Inventor: Ryo Konishi, Iwati (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 15/701,567

(22) Filed: Sep. 12, 2017

(65) Prior Publication Data
US 2017/0368872 A1 Dec. 28, 2017

Related U.S. Application Data

(63) Continuation of application No. PCT/JP2016/057751, filed on Mar. 11, 2016.

(30) Foreign Application Priority Data

Mar. 12, 2015 (JP) .................. 2015-049115

(51) Int. Cl.
*F16C 41/00* (2006.01)
*B60B 27/00* (2006.01)

(52) U.S. Cl.
CPC ...... *B60B 27/0068* (2013.01); *B60B 27/0073* (2013.01); *B60B 27/0094* (2013.01); *F16C 41/007* (2013.01); *F16C 2326/02* (2013.01)

(58) Field of Classification Search
CPC .... F16C 19/184; F16C 19/185; F16C 19/186; F16C 19/385; F16C 19/386; F16C 41/007;
(Continued)

(56) References Cited

U.S. PATENT DOCUMENTS

2012/0281939 A1* 11/2012 Nakamura .......... B60B 27/0005
384/477
2013/0249273 A1* 9/2013 Norimatsu .......... B60B 27/0068
301/109
(Continued)

FOREIGN PATENT DOCUMENTS

DE 20 2014 100 116 3/2014
JP 2004-354066 12/2004
(Continued)

*Primary Examiner* — Phillip A Johnson
(74) *Attorney, Agent, or Firm* — Harness, Dickey & Pierce, P.L.C.

(57) ABSTRACT

A wheel bearing apparatus, incorporating a wheel speed detecting apparatus, has a mounting portion (17) on a cover body (15). It includes an insertion portion (17*a*) formed with a bottom insertion bore (22), and a cylindrical securing portion (17*b*). A wheel speed sensor unit (18) is secured in the insertion portion (17*a*) by a securing bolt (21), via a mounting member (20). The insertion portion (17*a*) of the mounting portion (17) is arranged at a horizontal position through the center of a bottom 15*c* of the cover body (15). The securing portion (17*b*) is arranged at a position vertically below the insertion portion (17*a*). The wheel speed sensor (18) and a pulser ring (14) oppose each other, via a bottom (22*a*) of the insertion bore (22). A discharging portion, with an axially extending slit (24) or discharging groove (26), is formed at a road surface-side of the insertion bore (22) to communicate the insertion bore (22) with the outside.

7 Claims, 6 Drawing Sheets

(58) Field of Classification Search
CPC ............. F16C 2326/02; B60B 27/0068; B60B 27/0094
See application file for complete search history.

(56) References Cited

U.S. PATENT DOCUMENTS

| | | | |
|---|---|---|---|
| 2015/0069826 A1* | 3/2015 | Suzuki | F16C 33/768 301/109 |
| 2016/0009128 A1* | 1/2016 | Wakatsuki | F16C 33/723 384/448 |

FOREIGN PATENT DOCUMENTS

| | | |
|---|---|---|
| JP | 2010-175031 | 8/2010 |
| JP | 2013-204652 | 10/2013 |
| JP | 2014-129880 | 7/2014 |

* cited by examiner

Fig. 3
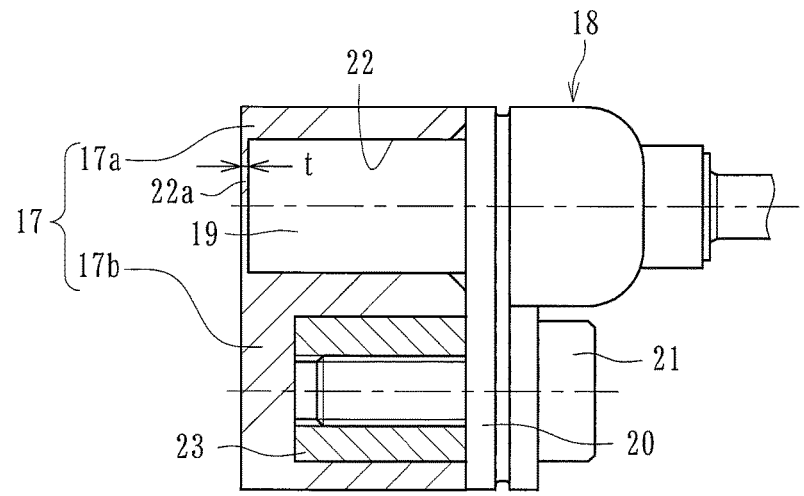
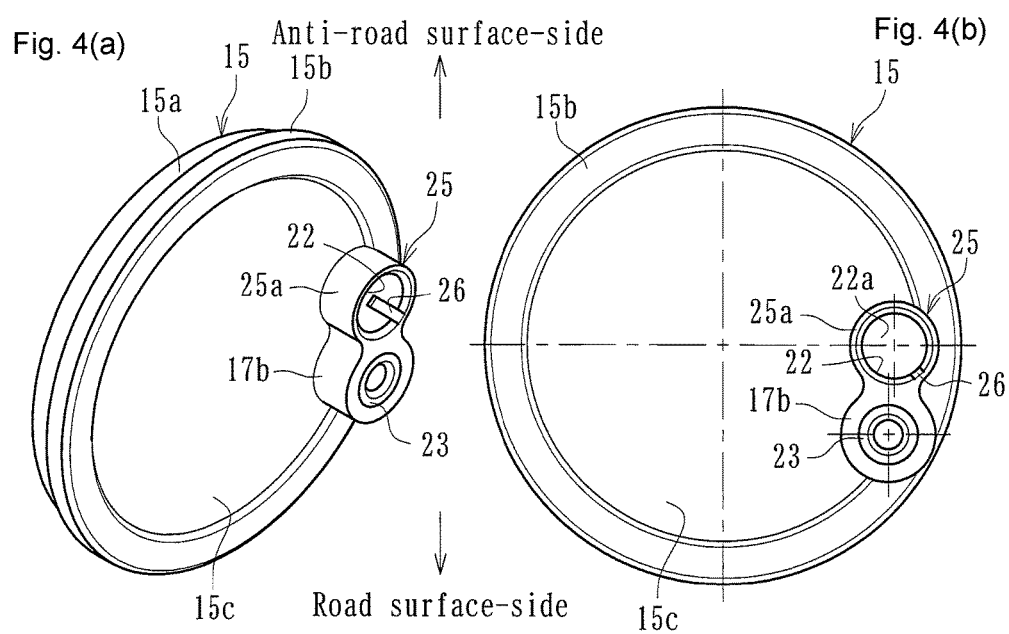
Fig. 4(a)
Fig. 4(b)

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2016/057751, filed Mar. 11, 2016, which claims priority to Japanese Application No. 2015-049115, filed Mar. 12, 2015. The disclosures of the above applications are incorporating herein by reference.

FIELD

The present disclosure relates to a wheel bearing apparatus that rotationally supports a wheel of an automobile, etc., relative to a suspension apparatus and, more particularly, to a wheel bearing apparatus incorporating a wheel speed detecting apparatus. The wheel rotation speed detecting apparatus is built to improve the sealability of a detecting portion as well as improve reliability.

BACKGROUND

Recently, wheel speed detecting apparatus has been proposed that includes a magnetic encoder with magnetic characteristics changing along the circumference of the encoder. A wheel speed sensor controls the anti-lock brake system (ABS) by detecting the wheel rotation speed in accordance with the rotation of the encoder. The wheel speed sensor is built in a bearing in order to eliminate complications of air gap adjustment of the encoder and to make the size of the speed detecting apparatus compact.

An example of such a wheel bearing apparatus incorporating the wheel speed detecting apparatus is shown in FIG. 9. This wheel bearing apparatus, incorporating the wheel speed detecting apparatus, is adapted to be mounted on a knuckle of a vehicle (not shown). It includes an outer member 51 and an inner member 52 inserted into the outer member 51, via double row balls 53, 53. The inner member 52 includes a wheel hub 55 and an inner ring 56 fit onto the wheel hub 55.

The outer member 51 is integrally formed with a body mounting flange 51b on its outer circumference. The body mounting flange 51b is to be mounted on a knuckle of a vehicle. The outer member inner circumference includes double row outer raceway surfaces 51a, 51a. The inner member 52 includes double row inner raceway surfaces 55a, 56a opposing the double row outer raceway surfaces 51a, 51a. One inner raceway surface 55a of the double row inner raceway surfaces 55a, 56a is formed on the outer circumference of the wheel hub 55. The other inner raceway surface 56a is formed on the outer circumference of the inner ring 56. The inner ring 56 is press-fit onto a shaft-like cylindrical portion 55b. The cylindrical portion 55b axially extends from the inner raceway surface 55a of the wheel hub 55. Double row balls 53, 53 are contained in a space formed between the outer raceway surfaces 51a, 51a and the inner raceway surfaces 55a, 56a. The balls 53, 53 are rollably held by cages 57, 57.

The wheel hub 55 is integrally formed with a wheel mounting flange 54 on its outer circumference. The wheel mounting flange 54 mounts a wheel (not shown). The inner ring 56 is axially secured by a caulked portion 58. The caulked portion 58 is formed by plastically deforming the end of the cylindrical portion 55b radially outward. A seal 59 and a cover 60 are mounted on ends of the outer member 51. The seal 59 prevents leakage of lubricating grease sealed within the bearing space and entry of rain water or dust into the bearing space from the outside.

An encoder 61 is press-fit on the inner ring 56. The encoder includes a cylindrical mounting portion 61a and an encode body 61b. The mounting portion 61a has a generally annular configuration formed by plastically working a magnetic sheet such as soft steel sheet etc. It is adapted to be press-fit onto the inner ring 56. The encoder body 61b is adapted to be mounted on a flanged portion of one end of the mounting portion 61a. The encoder body 61b is formed by arranging a permanent magnet, such as a rubber magnet, in an annular fashion. The magnet is magnetized so that the magnetic poles N and S are alternately arranged in a circumferential direction to generate magnetic field variation due to rotation of the encoder body 61b.

The cover 60 is formed with a bottomed cylindrical configuration by injection molding of synthetic resin. A cylindrical portion 60a is fit in an opened end of inner-side of the outer member 51. The opened end of the outer member 51 is closed by a lid portion 60b. As shown in FIG. 10, a cylindrical sensor mounting portion 62 is formed on the lid portion 60b. An insertion portion 64a of a sensor 64 is inserted into a sensor mounting bore 63. The bore 63 is formed in the sensor mounting portion 62. A partition wall 66, with a thickness of 0.3 to 0.5 mm, is formed on the bottom of the sensor mounting bore 63 to separate the sensor mounting bore 63 and an inside space 65 of the bearing. The partition wall 66 is injection molded integrally with the cover 60. Since its material is a non-magnetic synthetic resin, the partition wall 66 does not cause any influence to the detection accuracy.

An outer shell of the sensor 64 is formed from synthetic resin. The sensor 64 is mounted on the cover by inserting the sensor insertion portion 64a into the sensor mounting bore 63. The sensor insertion portion 64a opposes part of the encoder body 61b, via the partition wall 66 of the sensor mounting bore 63. A detection portion (not shown), to detect magnetic variation generated by rotation of the encoder 61, is contained within the sensor insertion portion 64a. It is positioned near the partition wall 66 opposing the encoder body 61b.

In the prior art wheel bearing apparatus, incorporating the wheel speed detecting apparatus, the partition wall 66, separating the sensor mounting bore 63 and the inside space 65 of the bearing, is provided. The sensor mounting bore 63 does not pass through the cover 60. Thus, less passage of foreign matters is achieved. Also, whole sealability of the apparatus is superior to previous apparatus. In addition, since the partition wall 66 and the cover 60 are integrally molded structure, assembling work of the cover 60 is simplified. See, JP 2004-354066 A.

As described above, the prior art wheel bearing apparatus, incorporating the wheel speed detecting apparatus, includes the partition wall 66 to separate the sensor mounting bore 63 and the inside space 65 of the bearing. Thus, less passage or entry of foreign matters occurs. Additionally, whole sealability of the apparatus is superior to previous apparatus. However, it is known that the detecting accuracy is significantly lowered when the air gap between the encoder 61 and the sensor 64 exceeds 2 mm. Thus, it is necessary to reduce the thickness of the partition wall 66. However, it is believed that the partition wall 66 would be damaged if any foreign matter is pinched in the detecting portion. Thus, sealability would be impaired.

On the contrary, it is also a problem that once foreign matter has entered into the sensor mounting bore 63, it cannot easily be discharged since the sensor mounting bore 63 does not pass through the cover 60.

SUMMARY

It is, therefore, an object of the present disclosure to provide a wheel bearing apparatus incorporating a wheel speed detecting apparatus that improves the sealability of the detecting portion as well as the reliability of the sensor.

To achieve the above-mentioned object, a wheel bearing apparatus incorporating a wheel speed detecting apparatus comprises an outer member integrally formed with a body mounting flange on its outer circumference. The body mounting flange is to be mounted on a knuckle of a vehicle. The outer member inner circumference includes double row outer raceway surfaces. An inner member includes a wheel hub and at least one inner ring. The wheel hub is integrally formed with a wheel mounting flange on its one end. A cylindrical portion axially extends from the wheel mounting flange. The inner ring is press-fit onto the cylindrical portion of the wheel hub. The inner member outer circumferences include double row inner raceway surfaces opposing the double row outer raceway surfaces. Double row rolling elements are rollably contained between the inner and outer raceway surfaces of the inner member and the outer member. A pulser ring is mounted on the inner ring. The pulser ring has magnetic characteristics varying alternately and equidistantly along its circumference. A bottomed cylindrical cover, formed from synthetic resin, is mounted on an innerside end of the outer member to close an inner-side opening of the outer member. A wheel speed detecting sensor is mounted in a cylindrical mounting portion formed at a radially outward portion of the cover. The mounting portion axially projects from the cover. The mounting portion is arranged so that the wheel speed detecting sensor opposes the pulser ring, via a predetermined air gap. The mounting portion comprises an insertion portion formed with a blind insertion bore, with a bottom, and a cylindrical securing portion. A securing bolt is fastened in the securing portion to secure the wheel speed detecting sensor, via a mounting member. The wheel speed detecting sensor and the pulser ring opposes each other, via the bottom of the insertion bore. A discharging portion, comprising an axially extending slit or discharging groove, is formed at a road surface-side of the insertion bore. The discharging portion communicates the insertion bore with the outside.

The wheel bearing apparatus incorporating a wheel speed detecting apparatus includes a pulser ring. The pulser ring has its magnetic characteristics varying alternately and equidistantly along its circumference. It is mounted on the inner ring. A bottomed cylindrical cover, formed from synthetic resin, is mounted on an inner-side end of the outer member to close an inner-side opening of the outer member. A wheel speed detecting sensor is mounted in a cylindrical mounting portion formed at a radially outward portion of the cover. The mounting portion axially projects from the cover and is arranged so that the wheel speed detecting sensor opposes the pulser ring, via a predetermined air gap. The mounting portion includes an insertion portion, formed with a blind insertion bore having a bottom, and a cylindrical securing portion. A securing bolt is fastened through the securing portion to secure the wheel speed detecting sensor, via a mounting member. The wheel speed detecting sensor and the pulser ring oppose each other, via the bottom of the insertion bore. A discharging portion, comprising an axially extending slit or discharging groove, is formed at a road surface-side of the insertion bore. The discharge portion communicates the insertion bore with the outside. Thus, it is possible to provide a wheel bearing apparatus, incorporating a wheel speed detecting apparatus, that can easily discharge foreign material entered through a gap between the sensor unit and the insertion bore without opposing gravity. This improves the sealability of the detecting portion as well as the reliability of the wheel bearing apparatus. Also, this prevents the wheel speed sensor from being damaged by foreign matter.

The insertion portion of the mounting portion is arranged at a horizontal position through the center of a bottom of the cover. The securing portion is arranged at a position vertically below the insertion portion. The discharging portion is formed on a portion of a road surface-side connection between the insertion portion and the securing portion. This prevents the cover from interfering with the inner member and reduces the weight and size of the bearing apparatus.

The discharging portion is formed in an anti-fastening direction of the securing bolt. This enables the sensor to be slightly moved toward the fastening direction of the securing bolt. Thus, a radial gap between the sensor and the insertion bore of the fastening direction, when the sensor unit is mounted, is made smaller than the radial gap of the anti-fastening direction. Accordingly, it is possible to suppress entry of foreign matter into the insertion bore as well as to easily discharge the foreign matter once it enters from the discharging portion of the larger gap formed in the anti-fastening side.

The insertion portion and the securing portion are arranged at horizontal positions through the center of a bottom of the cover. The discharging portion or the slit is formed on the insertion portion at a position nearest to the road surface. This effectively discharges foreign matter entered into the insertion bore from a gap between the insertion bore and the sensor.

A plurality of axially extending discharging grooves are formed on the inner circumference of the insertion bore. Each of the discharging grooves is formed as a tapered shape gradually expanding toward its opening. This easily discharges foreign matter entered through a gap between the sensor and the insertion bore.

The insertion bore is formed with a polygonal crosssection. Each corner of the insertion bore is formed with a circular arc shape. This forms the gap between the insertion bore and the inserted sensor as a discharging groove to easily discharge foreign matter from the gap between the insertion bore and the inserted sensor.

The insertion bore has a triangular cross-section, A corner of an anti-road surface-side of corners of the triangular insertion bore is formed with a circular arc shape with a radius of curvature larger than those of the other corners. This enables the corner with the circular arc shape of the larger radius of curvature to closely contact with the inserted sensor and form axially extending discharging grooves between the other corners of the road surface-side and the sensor. Accordingly, it is possible to easily discharge foreign matter entered from gaps between the insertion bore and the sensor. Also, it firmly positions the sensor without rattling to improve the detecting accuracy.

The wheel bearing apparatus, incorporating a wheel speed detecting apparatus, of the present disclosure comprises an outer member integrally formed with a body mounting flange on its outer circumference. The body mounting flange is to be mounted on a knuckle of a vehicle. The outer member inner circumference includes double row outer raceway surfaces. An inner member includes a wheel hub and at least one inner ring. The wheel hub is integrally formed with a wheel mounting flange on its one end. A cylindrical portion axially extends from the wheel mounting flange. The inner ring is press-fit onto the cylindrical portion of the wheel hub. The inner member outer circumferences include double row inner raceway surfaces opposing the double row outer raceway surfaces. Double row rolling elements are rollably contained between the inner and outer raceway surfaces of the inner member and the outer member. A pulser ring is mounted on the inner ring. The pulser ring has magnetic characteristics varying alternately and equidistantly along its circumference. A bottomed cylindrical cover, formed from synthetic resin, is mounted on an inner-side end of the outer member to close an inner-side opening of the outer member. A wheel speed detecting sensor is mounted in a cylindrical mounting portion formed at a radially outward portion of the cover. The mounting portion axially projects from the cover and is arranged so that the wheel speed detecting sensor opposes the pulser ring, via a predetermined air gap. The mounting portion includes an insertion portion, formed with a blind insertion bore having a bottom, and a cylindrical securing portion. A securing bolt is fastened through the securing portion to secure the wheel speed detecting sensor, via a mounting member. The wheel speed detecting sensor and the pulser ring oppose each other, via the bottom of the insertion bore. A discharging portion, including an axially extending slit or discharging groove, is formed at a road surface-side of the insertion bore. The discharge portion communicates the insertion bore with the outside. Thus, it is possible to provide a wheel bearing apparatus, incorporating a wheel speed detecting apparatus, that can easily discharge foreign material entered through a gap between the sensor unit and the insertion bore without opposing gravity. This improves the sealability of the detecting portion as well as the reliability of the wheel bearing apparatus. Also, it prevents the wheel speed sensor from being damaged by foreign matter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a partially cross section view taken along a line IIIa-IIIb-IIIc-IIId of FIG. 2(b).

FIG. 4(a) is a perspective view of a cover that is a modification of FIG. 2.

FIG. 4(b) is a front elevation view of FIG. 4(a).

DETAILED DESCRIPTION

A wheel bearing apparatus, incorporating a wheel speed detecting apparatus, includes an outer member with a body mounting flange integrally formed on its outer circumference. The body mounting flange is to be mounted on a knuckle of a vehicle. The outer member inner circumference includes double row outer raceway surfaces. An inner member includes a wheel hub and an inner ring. The wheel hub has an integrally formed wheel mounting flange at its one end. The wheel hub outer circumference has an inner raceway surface opposing one of the double row outer raceway surfaces. A cylindrical portion axially extends from the inner raceway surface. The inner ring is fit onto the cylindrical portion of the wheel hub. The inner ring has another inner raceway surface opposing the other of the double row outer raceway surfaces. Double row rolling elements are rollably contained between the inner and outer raceway surfaces of the inner member and the outer member. A pulser ring is mounted on the inner ring. The pulser ring has magnetic characteristics varying alternately and equidistantly along its circumference. A bottomed cylindrical cover, formed from synthetic resin, is mounted on an inner-side end of the outer member to close an inner-side opening of the outer member. A wheel speed detecting sensor is mounted in a cylindrical mounting portion formed at a radially outward portion of the cover. The mounting portion axially projects from the cover and is arranged so that the wheel speed detecting sensor opposes the pulser ring, via a predetermined air gap. The mounting portion includes an insertion portion, formed with a blind insertion bore having a bottom, and a cylindrical securing portion. A securing bolt is fastened to secure the wheel speed detecting sensor, via a mounting member. The insertion portion of the mounting portion is arranged at a horizontal position through the center of a bottom of the cover. The securing portion is arranged at a position vertically below the insertion portion. The wheel speed detecting sensor and the pulser ring oppose each other, via the bottom of the insertion bore. A discharging portion, comprising an axially extending slit or discharging groove, is formed at a road surface-side of the insertion bore to communicate the insertion bore with the outside.

A preferable embodiment of the present disclosure will be described with reference to accompanied drawings.

Figure 1:
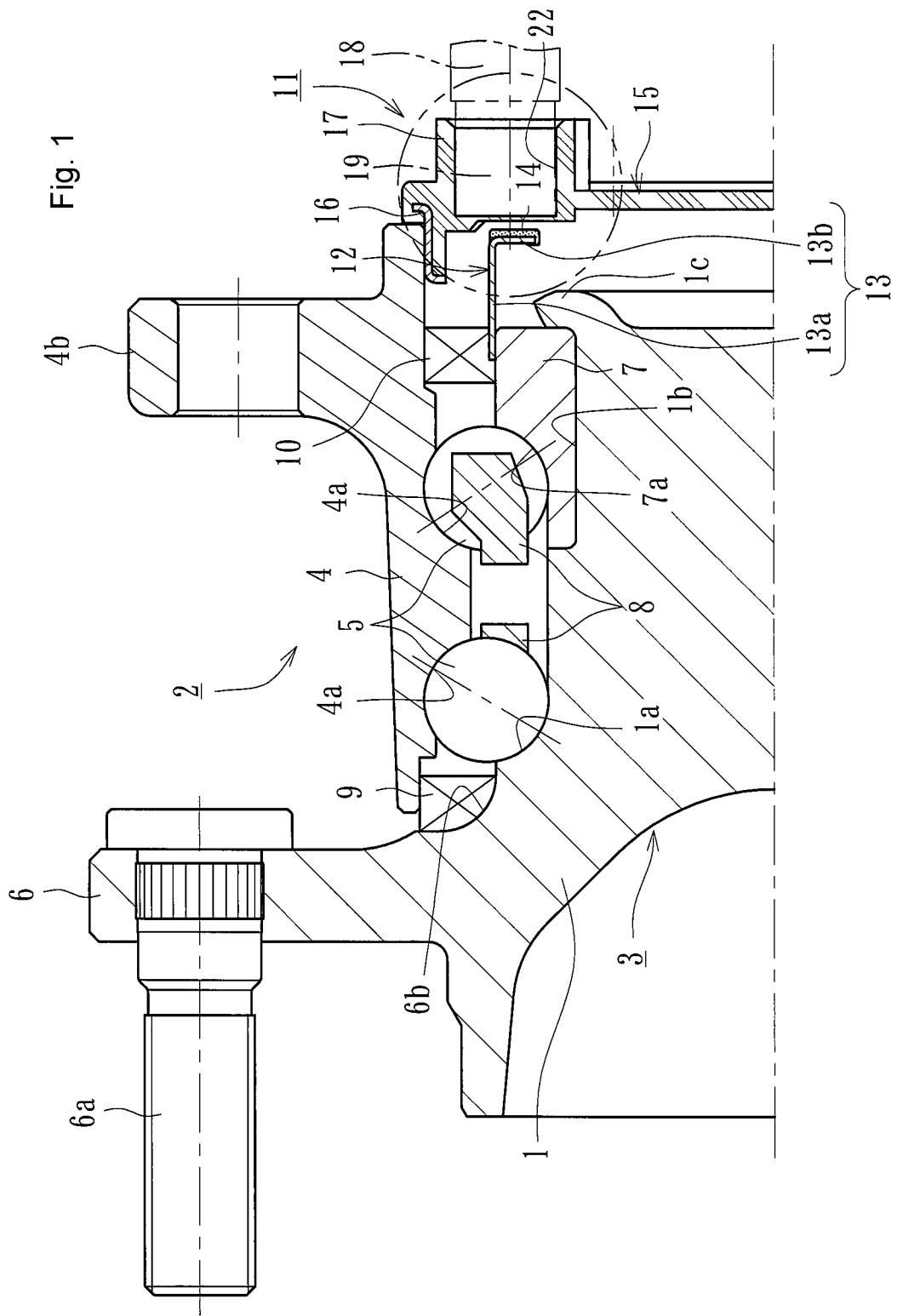
FIG. 1 is a longitudinal section view of one embodiment of a wheel bearing apparatus incorporating a wheel speed detecting apparatus.
Figure 2A:
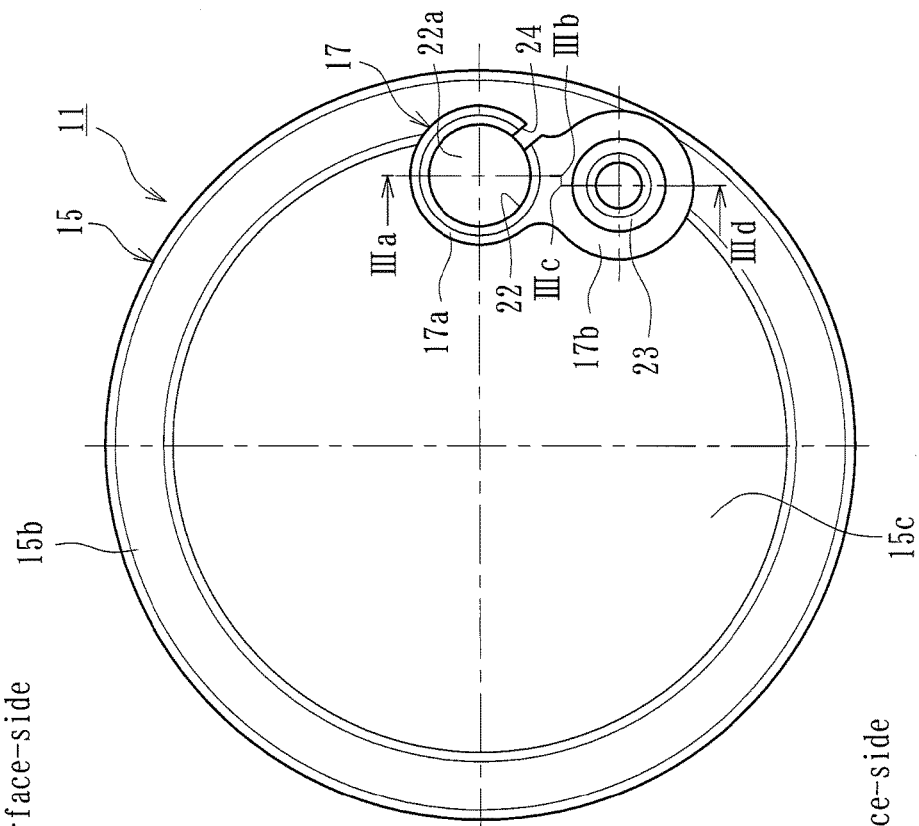
FIG. 2(a) is a perspective view showing a cover of FIG. 1.
Figure 2B:
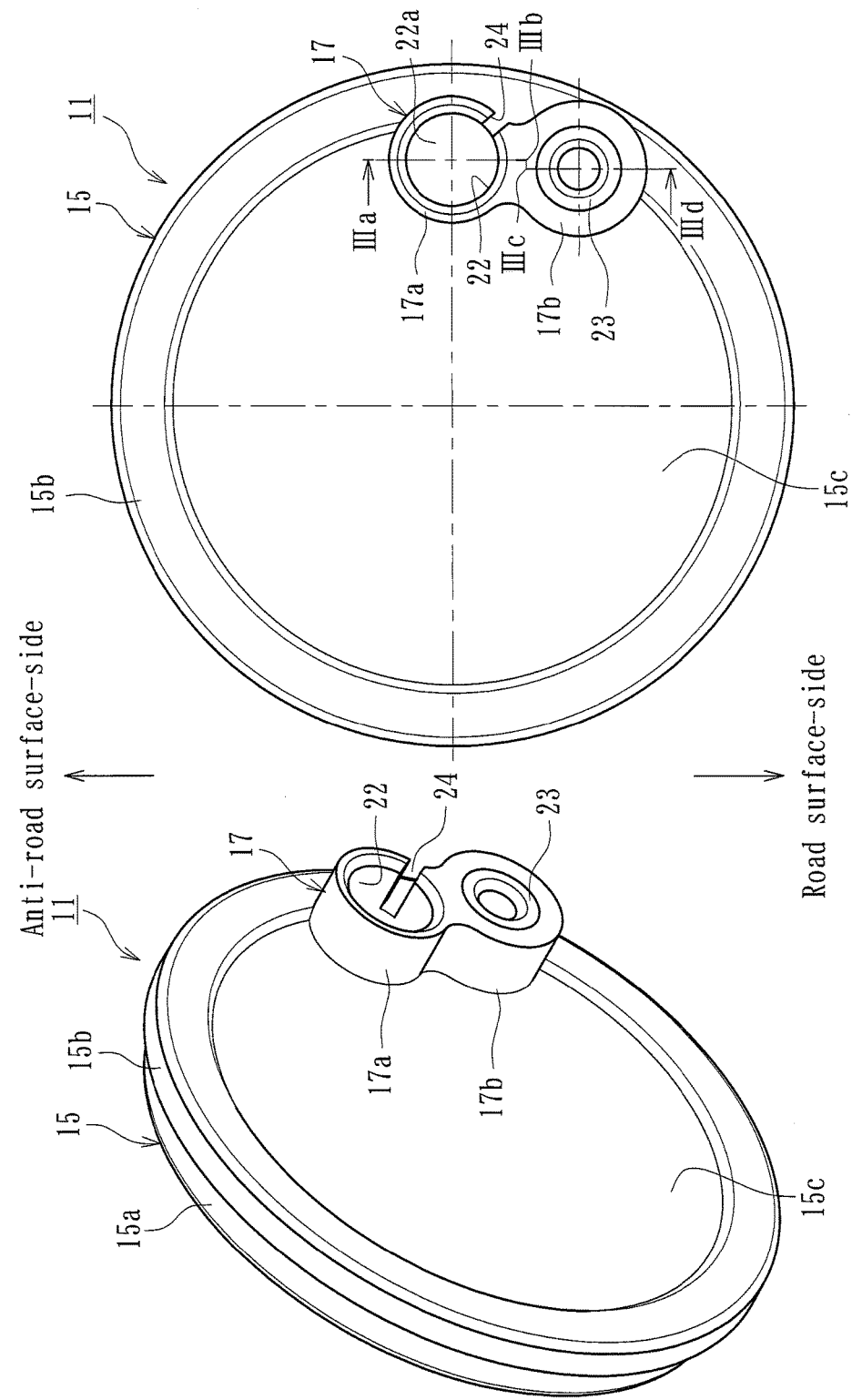
FIG. 2(b) is a front elevation view of FIG. 2(a).
Figure 5A:
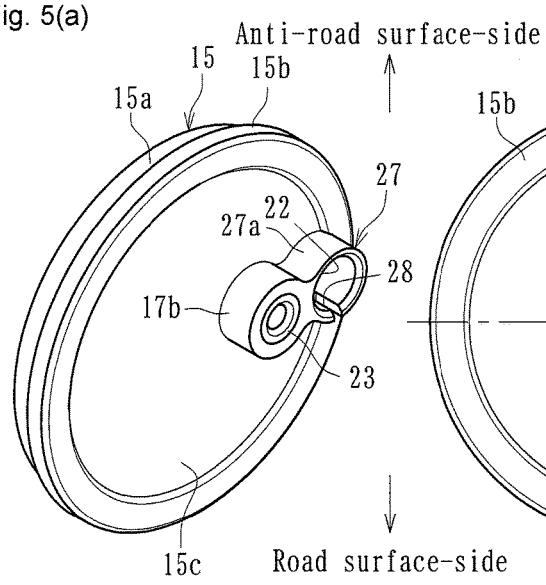
FIG. 5(a) is a perspective view of a cover of another modification of FIG. 2.
Figure 5B:
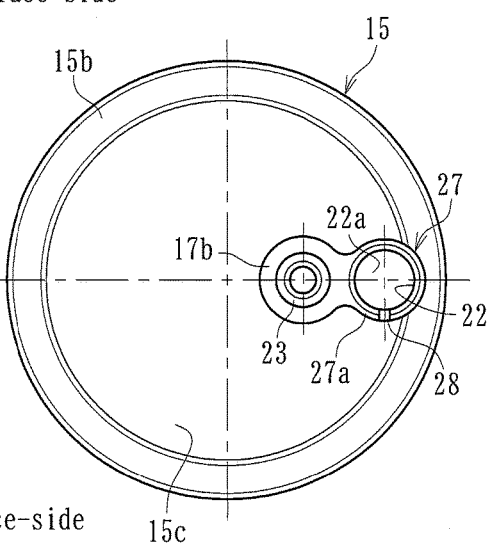
FIG. 5(b) is a front elevation view of FIG. 5(a).
Figure 6A:
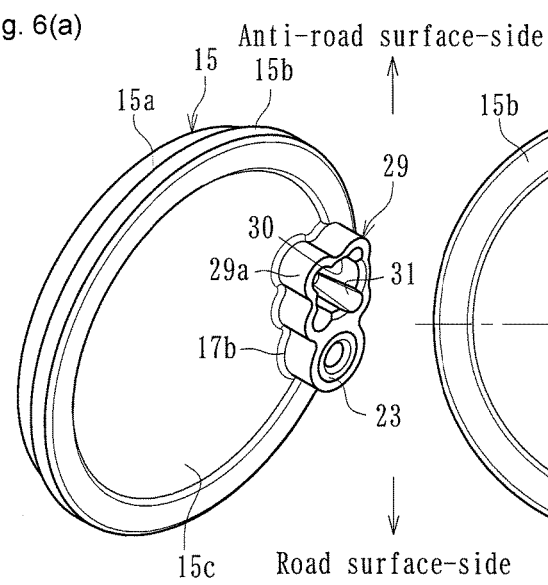
FIG. 6(a) is a perspective view of a cover of another modification of FIG. 2.
Figure 6B:
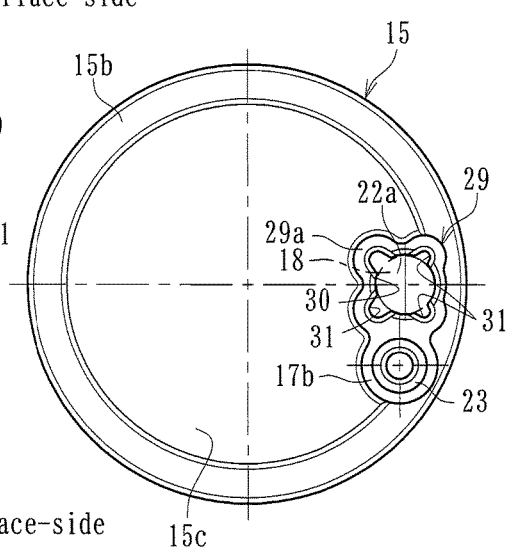
FIG. 6(b) is a front elevation view of FIG. 6(a).
Figures 7A, 7B:
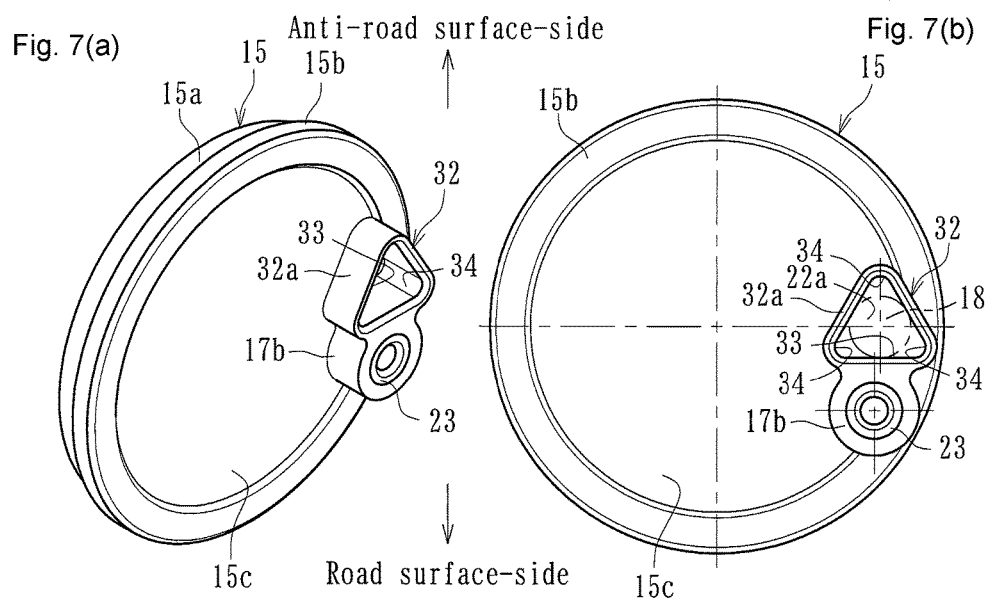
FIG. 7(a) is a perspective view of a cover of another modification of FIG. 2.
FIG. 7(b) is a front elevation view of FIG. 7(a).
Figure 8:
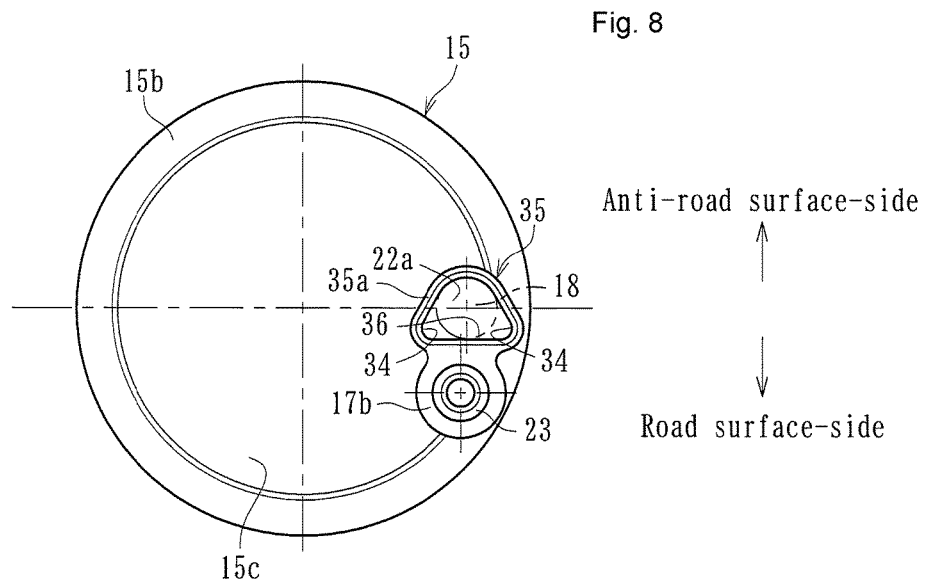
FIG. 8 is a front elevation view of a cover alone of a modification of FIG. 7.
Figure 9:
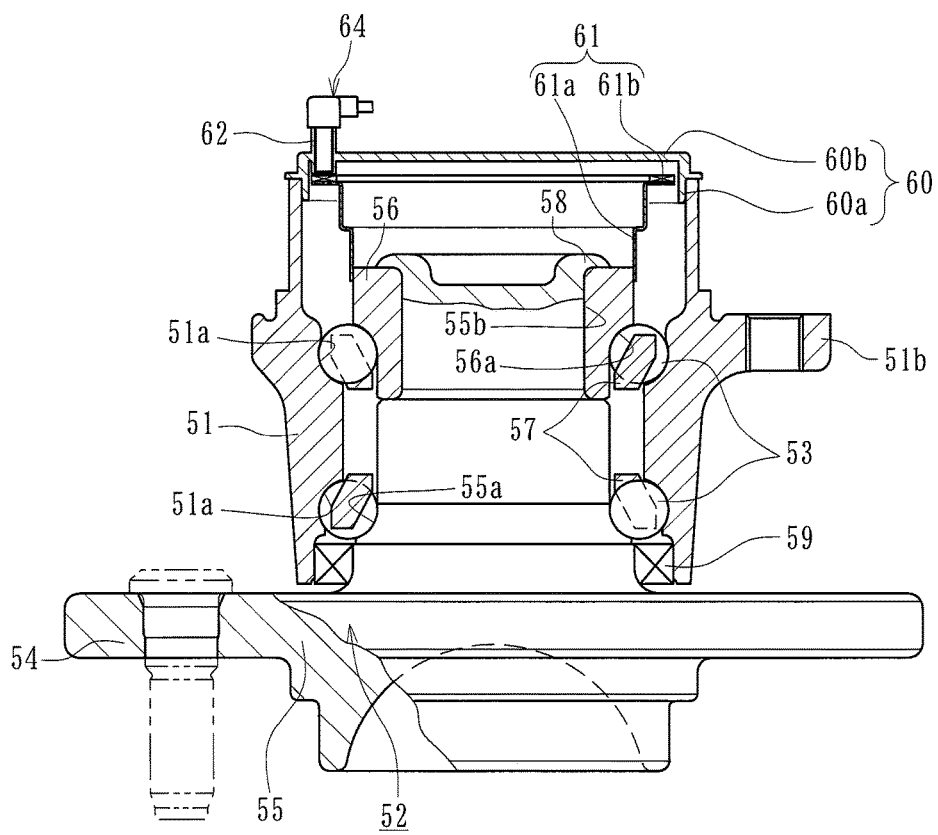
FIG. 9 is a longitudinal section view of a prior art wheel bearing apparatus incorporating a wheel speed detecting apparatus.
Figure 10:
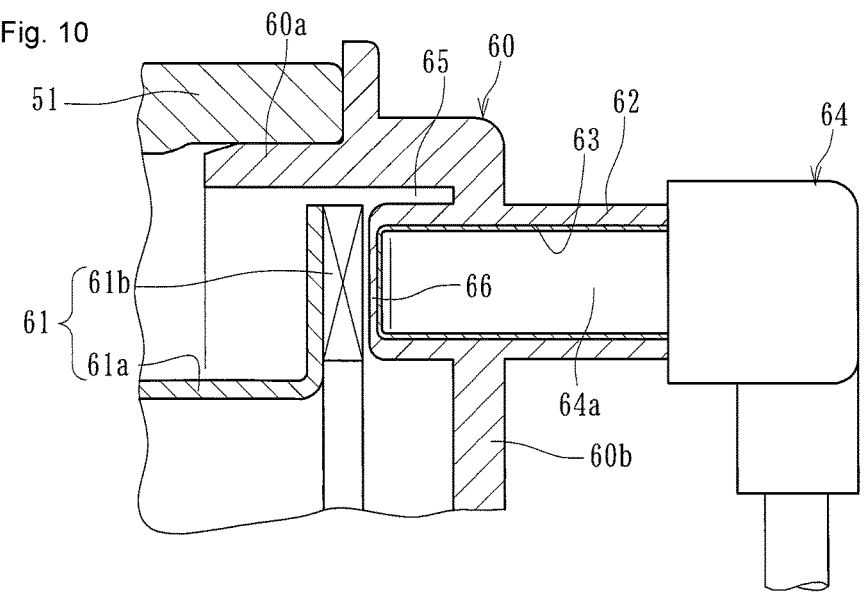
FIG. 10 is a partially enlarged view of FIG. 9.

FIG. 1 is a longitudinal section view of one embodiment of a wheel bearing apparatus incorporating a wheel speed detecting apparatus. FIG. 2(a) is a perspective view of a cover of FIG. 1. FIG. 2(b) is a front elevation view of FIG. 2(a). FIG. 3 is a partially cross section view taken along a line IIIa-IIIb-IIIc-IIId of FIG. 2(b). FIG. 4(a) is a perspective view of a cover of a modification of FIG. 2. FIG. 4(b) is a front elevation view of FIG. 4(a). FIG. 5(a) is a perspective view of a cover of another modification of FIG. 2. FIG. 5(b) is a front elevation view of FIG. 5(a). FIG. 6(a) is a perspective view of a cover of another modification of FIG. 2. FIG. 6(b) is a front elevation view of FIG. 6(a). FIG. 7(a) is a perspective view of a cover of another modification of FIG. 2. FIG. 7(b) is a front elevation view of FIG. 7(a). FIG. 8 is a front elevation view of a cover of a modification of FIG. 7. In the description below, an outer-side of a bearing apparatus, when it is mounted on a vehicle, is referred to as "outer-side" (the left side of FIG. 1). An inner-side of a bearing apparatus, when it is mounted on a vehicle, is referred to as "inner-side" (the right side of FIG. 1).

The wheel bearing apparatus incorporating a wheel speed detecting apparatus shown in FIG. 1 is a so called "third generation" type for a driven wheel. It includes a wheel hub 1 and a double row rolling bearing 2. The double row rolling bearing 2 includes an inner member 3, an outer member 4, and double row rolling elements (balls) 5, 5 rollably contained between the inner member 3 and outer member 4. The inner member 3 includes the wheel hub 1 and an inner ring 7 press-fit onto the wheel hub 1.

The wheel hub 1 is integrally formed with a wheel mount flange 6, to mount a wheel (not shown), at its outer-side end. An outer circumferential surface of the wheel hub 1 is formed with one (outer-side) inner raceway surface 1a. A cylindrical portion 1b axially extends from the inner raceway surface 1a. In addition, hub bolts 6a are secured on the wheel mount flange 6 at circumferentially equidistant positions.

The inner ring 7 outer circumference is formed with the other (inner-side) inner raceway surface 7a. The inner ring is press-fit on the cylindrical portion 1b of the wheel hub 1, via a predetermined interference. A caulked portion 1c is formed by plastically deforming an end of the cylindrical portion 1b radially outward. The inner ring 7 is axially secured relative to the wheel hub 1 by the caulked portion 1c in a state where a predetermined bearing pre-pressure is applied.

The wheel hub 1 is made of medium high carbon steel such as S53C etc. including carbon of 0.40 to 0.80% by weight. It is formed with a hardened layer having a surface hardness of 58 to 64 HRC by high frequency induction hardening. The hardened layer is in a region from an inner-side base 6b of the wheel mounting flange 6, forming the seal land portion of a seal, to the cylindrical portion 1b. The caulked portion 1c remains as a not-hardened portion with a surface hardness, after forging, of less than 25 HRC. The inner ring 7 is formed of high carbon chrome steel, such as SUJ2. It is hardened to its core to have a hardness of 58 to 64 HRC. The rolling elements 5 are also formed of high carbon chrome steel, such as SUJ2. They are dip hardened to their core to have a hardness of 62 to 67 HRC.

The outer member 4 is formed with a body mounting flange 4b on its outer circumference. The body mounting flange 4b is to be mounted on a knuckle (not shown). The outer member inner circumference includes double row outer raceway surfaces 4a, 4a that oppose the double row inner raceway surfaces 1a, 7a of the inner member 3. The outer member 4 is formed of medium high carbon steel such as S53C including carbon of 0.40 to 0.80% by weight. At least the outer raceway surfaces 4a, 4a, are hardened by high frequency induction hardening to have a surface hardness of 58 to 64 HRC. The double row rolling elements 5, 5 are rollably contained between the inner raceway surfaces 1a, 7a and the outer raceway surfaces 4a, 4a, via cages 8, 8.

Seals 9, 10 are mounted in annular openings formed between the outer member 4 and the inner member 3. The seals 9, 10 prevent leakage of lubricating grease sealed within the bearing and entry of rain water or dust from the outside into the bearing. A cover 11 is mounted in an inner-side opening of the outer member 4. The cover 11 closes the inner-side opening of the outer member 4 and prevents entry of rain water or dust from the outside into the detecting portion.

Since the inner-side opening of the outer member 4 is closed by the cover 11, the seal 10 is basically unnecessary. However, provision of seal 10 enables to further firmly prevent leakage of grease sealed within the bearing. That is, since the sealed grease does not leak into a space within the cover 11, it is possible to limit the amount of grease to a minimum. Thus, this achieves a reduction of weight and manufacturing cost of the wheel bearing apparatus as well as it suppresses increased temperature of the apparatus due to agitation of the grease.

In the illustrated embodiment, although it is shown as a double row angular contact ball bearing, using balls as rolling elements 5, 5, it is possible to use a double row tapered roller bearing with tapered rollers as rolling elements. In addition, although the bearing structure is shown as a third generation type, it is possible to use a so-called second generation type bearing, with a pair of inner rings press-fit onto the cylindrical portion of the wheel hub.

In this embodiment, a pulser ring 12 is press-fit onto the outer circumference of the inner ring 7. The pulser ring 12 includes an annular supporting member 13 and a magnetic encoder 14. The magnetic encoder is integrally adhered to a side surface of the supporting member 13, via vulcanized adhesive etc. The magnetic encoder 14 is formed of elastomer such as rubber. Magnetic powder, such as ferrite etc., is mingled into the rubber so that N and S poles are alternately arranged along its circumference to form a rotary encoder to detect the wheel rotation speed.

The supporting member 13 is press-formed from a ferromagnetic steel plate such as ferritic stainless steel sheet (JIS SUS 430 etc) or preserved cold rolled steel sheet. It has an L-shaped cross-section and includes a cylindrical fitting portion 13a, press-fit on the inner ring 7, and a standing portion 13b, extending radially inward from the fitting portion 13a. The magnetic encoder 14 is adhered on the inner-side surface of the standing portion 13b.

The cover 11 is fit in an inner-side opened end of the outer member 4 to close the opening of the outer member 4. The cover 11 includes a bottomed cylindrical cover body 15, of synthetic resin, and a metal core 16, integrally molded in an opening of the cover body 15. It is possible that the cover 11 may be mounted on the outer member 4 so that the synthetic resin portion of the cover 11 directly contacts the outer member 4. Here, the metal core 16 is devoid of synthetic resin and the naked metal core 16 engages the outer member to increase the strength, rigidity and anti-falling out force of the cover 11. This also improves the sealability at the fitting portion.

The cover body 15 is injection molded from non-magnetic special ether-based synthetic resin, such as polyphenilene sulphide (PPS) etc., that with added reinforcing material, such as glass fibers (GF) etc. of 30 to 50% by weight. This improves durability of the cover body 15 for a long term while increasing corrosion resistance, strength and rigidity without adversely affecting the detection performance of the wheel speed sensor 19. The cover body 15 may be injection molded from materials such as PA (polyamide) 66, PA6, PA12, PPA (polyphthalamide), PBT (polybutylene terephthalate) other than material mentioned above. The fiber reinforcement may be used such as CF (carbon fibers), aramid fibers or boron fibers etc. other than GF.

The metal core 16 is press-formed from stainless steel sheet or cold rolled steel sheet. It has an annular shape with an L-shaped cross-section. The metal core 16 is preferably formed of non-magnetic steel sheet, such as austenitic stainless steel sheet (e.g. JIS SUS304), to prevent the detecting performance of the wheel speed sensor 19 from being adversely affected.

As shown in FIGS. 2(a) and (b), the cover body 15 includes a cylindrical fitting portion 15a and a flanged portion 15b and a bottom portion 15c. The fitting portion 15a is fit into an end of the outer member. The flanged portion 15b projects radially outward from the fitting portion 15a. The flanged portion 15b is adapted to be in close contact with the end face of the outer member 4. In addition, an axially projecting mounting portion 17 is integrally formed at a radially outer portion with the bottom portion 15c.

The mounting portion 17 includes a cylindrical insertion portion 17a and a cylindrical securing portion 17b. The cylindrical insertion portion 17a mounts a sensor unit 18. The cylindrical securing portion 17b is secured by a securing bolt 21, via a mounting member 20 described later. The mounting portion 17 is not arranged to extend on a radial line through the center of the bottom portion 15c of the cover body 15. It is arranged so that the insertion portion 17a of the mounting portion 17 is arranged at a horizontal position through the center of the bottom 15c of the cover 11. The securing portion 17b is arranged at a position vertically below the insertion portion 17a. This improves the freedom of design to prevent the mounting portion 17 from interfering with the inner member 3, such as the caulked portion 1c. Thus, this reduces the weight and size of the bearing apparatus. In addition, the insertion portion 17a is formed with an insertion bore 22 to mount the sensor unit 18 therein. A nut 23, engaging with the securing bolt 21, is embedded in the securing portion 17b.

As shown in FIG. 3, the sensor unit 18 includes a wheel rotation speed sensor 19 and an IC. The speed sensor 19 includes a magnetic detecting element such as a Hall effect element, magnetic resistance element (MR element) etc. for changing its characteristics in accordance with the flow direction of magnetic flux. The IC incorporates a wave forming circuit (not shown) to rectify the output wave form of magnetic detecting element. This constitutes an ABS of an automobile to control the wheel rotation speed by detecting its rotation speed. The sensor unit 18 is secured to the mounting portion 17 by the securing bolt 21, via the mounting member 20. The mounting member 20 has a cocoon shaped configuration. This makes it possible to prevent the wheel speed sensor 19 from being displaced toward the rotational direction of the securing bolt 21 around its rotational center. Thus, it prevents the wheel speed sensor 19 from deviating from the insertion bore 22.

According to the present embodiment, the insertion bore 22 is formed as a blind bore having a bottom 22a. It is designed so that it positions at a position corresponding to the magnetic encoder 14. A thickness "t" of the bottom 22a is set at a range of 0.1 to 1.0 mm. If the thickness "t" is less than 0.1 mm, it is believed that it is insufficient in strength and rigidity and thus is subject to deformation or damaged due to collision with other parts during its assembly. On the contrary if the thickness "t" exceeds 1.0 mm, it is believed that the necessary magnetic flux density would not be obtained due to the excessive air gap.

Returning to FIG. 2, a slit (discharging portion) 24 is formed in the insertion bore 22 where the sensor unit 18 is mounted according to the mounting portion 17 of the cover 11 of the present disclosure. More particularly, the slit 24 is formed on a portion of a road surface-side connection between the insertion portion 17a and the securing portion 17b. Thus, the insertion bore 22 communicates with the outside, via the slit 24. This provides a wheel bearing apparatus, incorporating a wheel speed detecting apparatus, that can easily discharge foreign material entered through a gap between the sensor unit and the insertion bore 22 without opposing gravity. This improves the sealability of the detecting portion as well as the reliability of the wheel bearing apparatus. Also, it prevents the wheel speed sensor from being damaged by foreign matter.

In the illustrated embodiment, although it is shown as an active type wheel speed detecting apparatus with the magnetic encoder 14 shown in FIG. 1 and the rotational speed sensor 19 with the magnetic detecting element such as Hall element etc, the present disclosure is not limited to such a wheel speed detecting apparatus. A passive type detecting apparatus with a magnetic encoder, magnet and an annular coil may be used.

Modifications of the mounting portion of the cover body previously mentioned will be described with reference to FIGS. 4 to 8. The same reference numerals are used in the modifications to designate the same portions, parts or functions as those in the previously described embodiment.

A mounting portion 25 shown in FIG. 4 is basically different from the insertion portion 17a of the previously described embodiment (FIG. 2). The mounting portion 25 includes a cylindrical insertion portion 25a that mounts the sensor unit 18 and the securing portion 17b. The insertion portion 25a is arranged at a horizontal position through the center of a bottom 15c of the cover body 15. The securing portion 17b is arranged at a position vertically below the insertion portion 25a.

The insertion portion 25a is formed with the insertion bore 22. The insertion bore 22 is further formed with a discharging groove (discharging portion) 26. The discharging portion 26 is formed on a portion of a road surface-side connection between the insertion portion 25a and the securing portion 17b. Thus, the insertion bore 22 communicates with the outside, via the discharging groove 26. Similarly to the previous embodiment, this makes it possible to easily discharge foreign matter entered through gaps between the sensor unit 18 and the insertion bore 22. Thus, this prevents the wheel speed sensor 19 from being damaged by foreign matter. Also, it improves reliability.

The discharging portion 26 of the insertion bore 22 is formed on a portion of a road surface-side connection (right side connection in drawings) between the insertion portion 25a and the securing portion 17b. The discharging groove 26 is formed at a left side connection between the insertion portion 25a and the securing portion 17b when the securing bolt is a right-hand screw. This is due to the following reasons. Since the securing bolt is usually formed as a right-hand screw, the sensor unit 18 would be slightly moved toward the clockwise direction (fastening direction of the securing bolt). This movement of the sensor unit 18 causes a difference in the radial gap between the sensor unit 18 and the insertion bore 22 in the right and left positions of the insertion bore 22. Thus, the right side gap in the drawings of the insertion bore 22 would be smaller than the left side gap. Accordingly, when the securing bolt is a right-hand screw, foreign matter, once entered in the insertion bore 22, will be easily discharged from the left side discharging groove 26 with a large gap.

A mounting portion 27 shown in FIG. 5 is basically different from the previously described embodiment (FIG. 2) in the arrangement of the insertion portion 17a and the securing portion 17b. The mounting portion 27 includes a cylindrical insertion portion 27a that mounts the sensor unit 18 and the securing portion 17b. Both the insertion portion 27a and the securing portion 17b are arranged at horizontal positions through the center of a bottom 15c of the cover body 15.

The insertion portion 27a is formed with the insertion bore 22. The insertion bore 22 is further formed with a slit 28. The axially extending slit 28 is formed on the insertion portion 27a at a position nearest to the road surface. The insertion bore 22 communicates with the outside through the slit 28. This effectively discharges foreign matter entered into the insertion bore 22 through a gap between the insertion bore 22 and the sensor unit 18 without opposing gravity.

A mounting portion 29 shown in FIG. 6 is basically different from the previously described embodiment (FIG. 2) in the configuration of the insertion portion 17a. The mounting portion 29 includes a cylindrical insertion portion 29a that mounts the sensor unit 18 and the securing portion 17b. The insertion portion 29a is arranged at a horizontal position through the center of the bottom 15c of the cover body 15. The securing portion 17b is arranged at a position vertically below the insertion portion 29a.

The insertion portion 29a is formed with the insertion bore 30. The inner circumference of the insertion bore 30 is further formed with a plurality (four in this example) of axially extending discharging grooves 31 equidistantly along the inner circumference of the insertion bore 30. Each of the discharging grooves 31 is formed as a tapered shape gradually expanding toward its opening. The insertion bore 30 communicates with the outside through the discharging grooves 31. This makes it possible to easily discharge foreign matter entered through gaps between the sensor unit 18 and the insertion bore 30.

A mounting portion 32 shown in FIG. 7 is basically different from the insertion portion 17a of the previously described embodiment (FIG. 2). The mounting portion 32 includes a cylindrical insertion portion 32a that mounts the sensor unit 18 and the securing portion 17b. The insertion portion 32a is arranged at a horizontal position through the center of the bottom 15c of the cover body 15. The securing portion 17b is arranged at a position vertically below the insertion portion 32a.

The insertion portion 32a is formed with a polygonal (triangle in this example) cross-section. An insertion bore 33 with a polygonal shape (triangle in this example) corresponding to the outer circumference of the insertion portion 32a is also formed. Each corner of the triangular insertion bore 33 is formed with a circular arc surface. Accordingly, axially extending gaps between the sensor unit 18 and the insertion bore 33 form discharging grooves 34. Thus, the insertion bore 33 communicates with the outside and is able to easily discharge foreign matter entered through gaps between the sensor unit 18 and the insertion bore 33.

An insertion portion 35a of a mounting portion 35 shown in FIG. 8 is basically different from the insertion portion 32a of the previously described modification (FIG. 7) in configuration. The mounting portion 35 includes a cylindrical insertion portion 35a that mounts the sensor unit 18 and the securing portion 17. The insertion portion 35a of the mounting portion 35 is arranged at a horizontal position through the center of the bottom 15c of the cover body 15. The securing portion 17b is arranged at a position vertically below the insertion portion 35a.

The insertion portion 35a is formed with a triangular cross-section. The insertion bore 36 of triangular cross-section is formed in the interior of the insertion portion 35a. A corner of an anti-road surface-side of the corners of the triangular insertion bore 36 is formed with a circular arc shape having a radius of curvature (same radius of curvature as that of the sensor unit 18) larger than those of the other corners. Thus, it closely contacts an inserted sensor unit 18 and forms axially extending discharging grooves 34 between the other corners of road surface-side and the sensor unit 18 as shown in FIG. 8. Accordingly, the insertion bore 36 communicates with the outside and it easily discharges foreign matter entered from gaps between the insertion bore 36 and the sensor unit 18. Also, it firmly positions the sensor unit 18 without rattling to improve detecting accuracy.

The wheel bearing apparatus incorporating a wheel speed detecting apparatus of the present disclosure can be applied to inner ring rotation type wheel bearing apparatus of the second or third generation structure type.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a wheel speed detecting apparatus comprising:
   an outer member integrally formed with a body mounting flange on its outer circumference, the body mounting flange to be mounted on a knuckle of a vehicle, the outer member inner circumference includes double row outer raceway surfaces;
   an inner member includes a wheel hub and at least one inner ring, the wheel hub integrally formed with a wheel mounting flange on its one end, a cylindrical portion axially extends from the wheel mounting flange, the inner ring is press-fit onto the cylindrical portion of the wheel hub, and the inner member outer circumferences include double row inner raceway surfaces opposing the double row outer raceway surfaces;
   double row rolling elements are rollably contained between the inner and outer raceway surfaces of the inner member and the outer member;
   a pulser ring is mounted on the inner ring, the pulser ring has magnetic characteristics varying alternately and equidistantly along its circumference;
   a bottomed cylindrical cover, formed from synthetic resin, is mounted on an inner-side end of the outer member to close an inner-side opening of the outer member;
   a wheel speed detecting sensor is mounted in a cylindrical mounting portion formed at a radially outward portion of the cover, the cylindrical mounting portion axially projects from the cover and is arranged so that the wheel speed detecting sensor opposes the pulser ring, via a predetermined air gap; and
   the mounting portion includes an insertion portion, formed with a blind insertion bore with a bottom, and a cylindrical securing portion, a securing bolt is fastened to the cylindrical securing portion to secure the wheel speed detecting sensor, via a mounting member, the wheel speed detecting sensor and the pulser ring oppose each other, via the bottom of the insertion bore, and a discharging portion including an axially extending slit or discharging groove, is formed at a road surface-side of the insertion bore to communicate the insertion bore with the outside.

2. The wheel bearing apparatus incorporating the wheel speed detecting apparatus of claim 1, wherein the insertion portion of the mounting portion is arranged at a horizontal position through the center of a bottom of the cover, the securing portion is arranged at a position vertically below the insertion portion, and the discharging portion is formed on a portion of a road surface-side connection between the insertion portion and the securing portion.

3. The wheel bearing apparatus incorporating the wheel speed detecting apparatus of claim 2, wherein the discharging portion is formed in an anti-fastening direction of the securing bolt.

4. The wheel bearing apparatus incorporating the wheel speed detecting apparatus of claim 1 wherein the insertion portion and the securing portion are arranged at horizontal positions through the center of a bottom of the cover and the discharging portion, or the slit, is formed on the insertion portion at a position nearest to the road surface.

5. The wheel bearing apparatus incorporating the wheel speed detecting apparatus of claim 1, wherein a plurality of axially extending discharging grooves are formed on the inner circumference of the insertion bore and each of the discharging grooves is formed as a tapered shape gradually expanding toward the opening of the insertion bore.

6. The wheel bearing apparatus incorporating the wheel speed detecting apparatus of claim 1, wherein the insertion bore is formed with a polygonal cross-section and each corner of the insertion bore is formed with a circular arc shape.

7. The wheel bearing apparatus incorporating the wheel speed detecting apparatus of claim 1, wherein the insertion bore is formed with a triangular cross-section and a corner of an anti-road surface-side of corners of the triangular insertion bore is formed with a circular arc shape having a radius of curvature larger than those of the other corners.

\* \* \* \* \*